Figure 6:
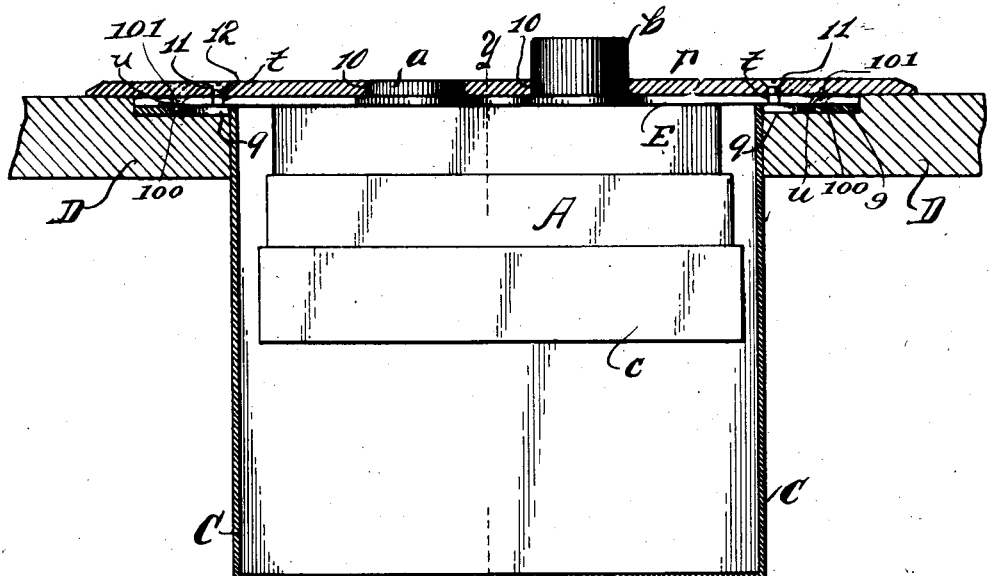

No. 872,432. PATENTED DEC. 3, 1907.
C. J. KLEIN.
ELECTRICAL APPARATUS.
APPLICATION FILED MAR. 18, 1907.
2 SHEETS—SHEET 1.
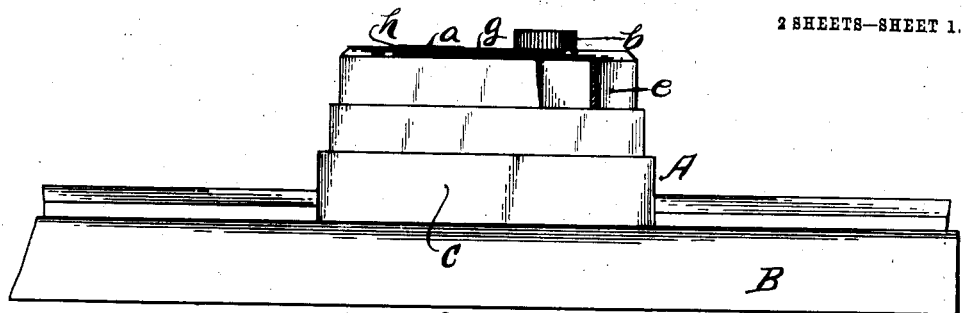
Fig. 1.
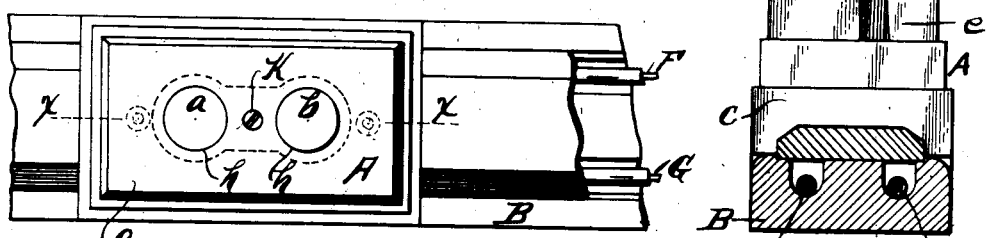 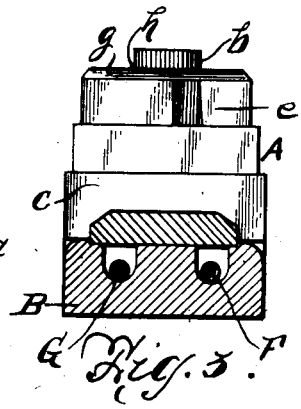
Fig. 2. Fig. 3.
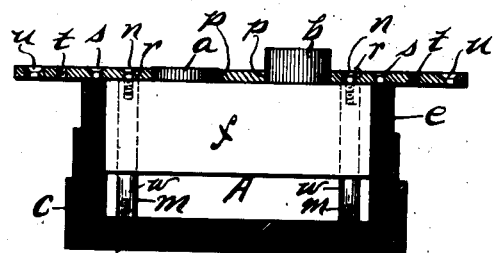
Fig. 4.
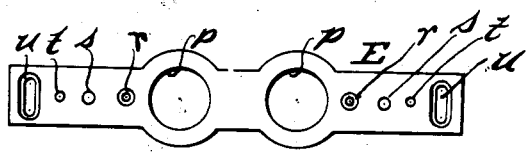
Fig. 5.
Witnesses
C. A. Jarvis
M. R. Matteo
Inventor
Charles Julius Klein,
By his Attorney No. 872,432. PATENTED DEC. 3, 1907.
C. J. KLEIN.
ELECTRICAL APPARATUS.
APPLICATION FILED MAR. 18, 1907.

2 SHEETS—SHEET 2.

Witnesses:
Inventor:

UNITED STATES PATENT OFFICE.

CHARLES JULIUS KLEIN, OF NEW YORK, N. Y., ASSIGNOR TO RALPH ABRAHAM SCHOENBERG, OF NEW YORK, N. Y.

ELECTRICAL APPARATUS.

No. 872,432.   Specification of Letters Patent.   Patented Dec. 3, 1907.

Application filed March 18, 1907. Serial No. 362,910.

*To all whom it may concern:*

Be it known that I, CHARLES JULIUS KLEIN, a citizen of the United States, residing in the borough of Manhattan, in the city, county, and State of New York, have invented certain new and useful Improvements in Electrical Apparatus, of which the following is a specification.

This invention relates to electrical apparatus, and more particularly to apparatus of that character known and termed as switches or apparatus for making and breaking electrical circuits. In this art, there are certain switches known as "snap" switches and other switches known as "push button" switches, and it is customary, in certain installations of these switches to mount the former, the bodies of which are relatively shallow, upon moldings conveniently placed in building interiors; and to mount the latter in boxes or casings set into the walls of buildings, the latter or push button switches having, customarily, relatively deep bodies not adapted to mounting upon moldings and particularly adapted for housing within such boxes or casings substantially flush with the wall of the structure in which the box or casing is arranged. Switches of the character under consideration are customarily employed for controlling service wires in dwellings and other buildings for lighting, heating and air-cooling apparatus. The relative merits of the two classes of switches are well understood, the push button switches being possibly somewhat more positive and efficient in operation, and more convenient in use as the relative positions of the push buttons indicate the condition of the current in the service wires controlled by the switches. The mechanical movement comprised within push button switches is ordinarily too extensive or bulky in its organization to permit such push button switches to be mounted upon a wall or molding, as above stated, whereas, simple snap switches are conveniently mounted in such manner and project but slightly beyond the wall or molding, causing a minimum obstruction of the room or other building interior.

As above stated, the push button type of switches is the most preferable form, and the most in demand in the best ordered installations.

In view of the above conditions of installation and service, and the desiderata growing out of same, I have perfected the present invention which has for its object to provide a push button switch, which, while adapted for installation exteriorly in connection with a wall, molding or other supporting structure, and presenting but a minimum of projection in such installation, by union with certain novel connection means, may be readily secured and supported within a wall box or casing to constitute a wall or "flush" switch.

The invention has for its object to provide electrical apparatus of the above character with the serviceable and convenient features of adaptability to various conditions and manners of installation above briefly referred to, which shall be simple and convenient in installation and use, and generally superior in point of efficiency and serviceability.

Figure 7:
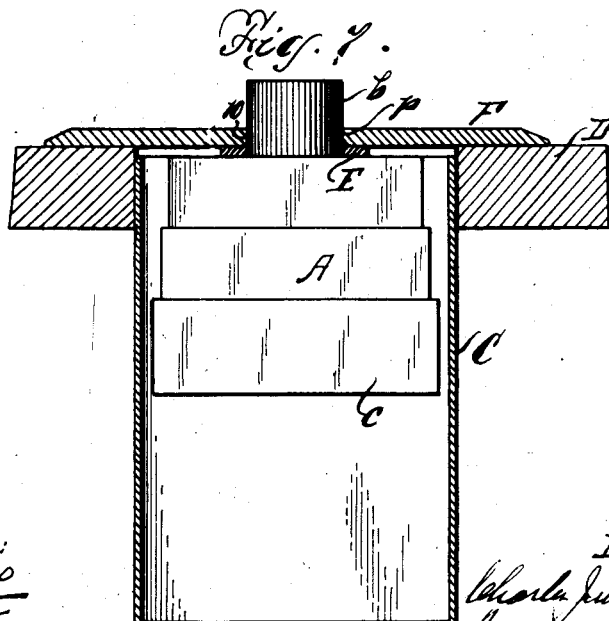

In the drawings:—Figure 1 is a side elevation of a molding and a push button switch mounted thereupon; Fig. 2 is a top plan view of the same; Fig. 3 is an end view of the same, partly in vertical section; Fig. 4 is a detail longitudinal sectional view, taken upon the line $x$—$x$, Fig. 2, of the push button switch shown in the foregoing figures, and combined with novel connection means according to the present invention; Fig. 5 is a top plan view of an essential member of said connection means; Fig. 6 is a vertical longitudinal sectional view, upon an enlarged scale, of the push button switch and connection means installed in connection with a wall box or casing; and, Fig. 7 is a vertical transverse sectional view, taken upon the line $y$—$y$, Fig. 6.

In all the figures the switch mechanism or mechanical movement of the same is shown as inclosed in a shell, casing or housing.

Corresponding parts in all the figures are designated by the same reference characters.

Referring with particularity to the drawings, A designates a push button switch, of which $a$ and $b$ are the push buttons proper, the mechanical movement or switch mechanism proper not being shown, but being inclosed within a casing or housing $c$ from which the push buttons $a$ and $b$ alternately project in the manipulation of the same in the customary or any desired manner. In Figs. 1 to 3 inclusive said push button switch is disclosed as mounted upon a molding B and secured to it in any suitable manner, and in Figs. 6 and 7 said push button switch is disclosed as housed within or connected with a box or casing C suspended or mounted within or behind a wall or other structural element D.

E designates connection means whereby the push button switch A, formed and adapted for mounting upon the molding B, may be received within and connected with the wall box or casing C. There is, of course, no predetermined limit of projection of the push button switch A out from or beyond the molding B, so that such projection shall not be inconvenient in service, but I have devised and perfected a push button switch, the mechanical movement or switch mechanism of which is so compact in form that it permits of the installation of such push button switch upon a molding or other structural support without causing undue and inconvenient projection of the entire switch. The present invention has no relation to the structural organization of such push button switch, and to practice the same with its full benefits and resultant convenience and efficiency it is only necessary to employ a push button switch of any operative construction which may be conveniently mounted upon a molding or other structural support and also housed within and connected with a wall box or casing. Furthermore, such push button switch, as is customary in every manufacture at present, will be substantially rectangular in form, as shown in the drawings, instead of being circular in form in agreement with the usual formation of snap switches. This rectangular formation permits of installation of the push button switch upon the molding within the transverse limits of the molding, as clearly shown in Figs. 2 and 3; whereas, the ordinary circular snap switches frequently over-lap the transverse limitations of the molding, as shown in dotted lines at d, Fig. 2; such over-lapping of the molding by such circular snap switches causing undesirable obstruction and unsightly appearance as well as inconvenience in installation of such snap switches when it is desired to arrange the same in a series upon a plurality of moldings fitting each other side to side, as is often the case.

F and G designate service wires or conductors extending along the molding B and controlled by the switch A. The association of such wires with such molding or with the box or casing C (not shown) may of course be of any suitable nature.

A particular form of construction and relative arrangement and connection of parts and members of improvements comprising the invention is as follows:—The casing c of the switch A, which is preferably rectangular in form and of porcelain or other insulating material, and which is preferably surrounded at its upper or outer portion or orifice with a metallic inclosing band or strip e, incloses and surrounds the mechanical movement or switch mechanism f, of any suitable type, from which project the push buttons a and b. The casing c includes an outer member or face plate g which incloses the movement or mechanism f, and through suitable openings h in which the push buttons have their play. The casing c and its plate g entirely surround and inclose the mechanism or movement f of the switch A when the same is used in connection with the molding B or other supporting structure as shown in Figs. 1 to 3, inclusive. The plate g is secured to the mechanism f by a screw or other connection device k. When it is desired to utilize the switch A as a wall switch in connection with the box or casing C, the plate g is detached from the casing c and the connection means or connection member E is combined with the casing c and the mechanism or movement f and with the box or casing C. Such connection means or member E may consist of an elongated plate with suitable connections for holding it in place. The elongated plate is provided intermediate of its end portions with two holes or openings p arranged to register with the push buttons a and b which latter play through said openings p. Between each of the openings p and the adjacent end portion of the plate are formed a plurality of smaller transverse openings r, s, t and u respectively, counting outwardly from the respective opening p.

The connection devices m consist of two spaced posts or rods w arranged within the box or casing c and projecting outwardly or upwardly from the inner or bottom portion of the casing c, being firmly connected therewith, as at 8. The posts or rods w are arranged beyond the end portions of the mechanism or movement f, so as to embrace the latter between the former, and when the plate E is fitted upon the casing c, so that the push buttons a and b register with the openings p, the openings r register with said posts or rods w, and the connection devices n, which may consist of screws, may be passed through the openings r and seated in the end portions of the posts or rods w to firmly bind the plate E upon the casing c and over and exteriorly of the movement or mechanism f. Or, alternatively, the connection devices n may be passed through the openings s in the plate E and seated in the walls of the casing c, such openings s being properly positioned to register with the end walls of the casing c. The casing c, the movement or mechanism f and the plate E are then inserted within the box or casing C, and are secured to a lateral flange 9 formed upon and surrounding the orifice of the box or casing C, as clearly shown in Fig. 6, such flange being arranged within a suitable chamber formed in the wall or other structure D. The connection means or plate E, the casing c, and the mechanism or movement f together with the push buttons a and b are now firmly connected with and housed within the box or casing C, the push buttons a and b being arranged to play through the openings p and project exteriorly of the plate which lies substantially flush with the outer surface of the wall or other structure D to entirely inclose the switch A, with the exception of the push buttons a and b, within the box or casing C. To present a neat appearance of the entirety, a face plate F of the standard or any preferred and suitable type is fitted over or upon the switch A and its inclosing box or casing C, extending over the upper or outer surface of the connection means or member E and overlapping the same and the flange 9 of the box or casing C, said face plate F being provided with transverse openings 10 registering with the openings p in the plate E and with the push buttons b.

The connection means or plate E is secured to the flange 9 of the box or casing C by means of screws 101, taking through the beveled opening U and registering with a suitable screw-threaded aperture 100 in the flange 9. The arrangement of parts is such that when the screws 101 are seated in the openings U, their heads are flush with the upper surface of the connection means E, see Fig. 6. The face plate F is secured to the connection means E and through it to the casing C by the connection means 11 which may be in the form of screws taking through the recess openings 12 of the face plate F, the screws registering with the screw-threaded apertures t in the connection means E.

The face plate F entirely incloses the switch A and the connection means or plate E within and upon the box or casing C, and lies flat against the wall or other supporting structure D. The switch A is now installed for use as a standard flush wall switch.

The method of use, operation and advantages of the improvements described and disclosed will be readily understood from the foregoing, taken in connection with the accompanying drawings and the following statement:—It is manifest that the switch A, of the push button type, is readily convertible from an exterior molding or wall switch to an interior or housed wall switch by combining the switch A with the connection means or plate E and then assembling or installing the entirety in connection with the box or casing C. Vice versa, the switch A may be readily removed from the box or casing C, together with the connection means or plate E, the latter may be readily removed from the switch, and the switch may then be exteriorly mounted or installed upon the molding B or other supporting structure. The face plate g, which is used in connection with the casing c when the switch is mounted upon the molding B, is readily detached from the casing c when it is desired to unite the connection means or plate E with the switch and mount the latter within the box or casing C. The connection devices n, whereby the plate 1 is connected with the switch, through the agency of the openings r or s in the plate 1, are conveniently and readily manipulated, and the other connection devices are readily manipulated to attach the plate E to the flange 9 of the box or casing C through the agency of the openings t in the plate 1. The installation of the face plate F, in substitution for the face plate g, to entirely inclose the switch and the connection means or plate E within and upon the box or casing C, is readily performed by means of the connection devices 11, which are readily seated in the openings 12 in the face plate F and the openings t in the elongated plate E. The connection devices m, consisting of the posts or rods w, effectually unite with the connection devices n in a preferred method of connecting the plate E with the switch. It will be understood that in lieu of the connection devices specifically described and disclosed other equivalent and suitable connection devices may be employed, and that the openings in the plate E may be varied in arrangement as required in accordance with the scheme of arrangement and application of the various connection devices for attaching the plate to the switch, to the box or casing C and to the face plate F.

It will be seen that the same switch A mounted upon the molding, as B, or installed exteriorly in any other manner, is made adaptable to installation in connection with a wall box or casing as C by the union with the switch of the connection means or plate E, and that an interchange of face plates F and g is all that is necessary in providing the proper exterior or outer finish for the switch in the respective installations. The face plates F are readily obtained in the open market, and any one purchasing a push button switch as described and disclosed, together with the connection means or plate E, can conveniently adapt the switch to use as a flush wall switch. As an article of manufacture a push button switch furnished with the connection means or plate E would thus be a decided improvement in the art over any existing switch, having the double capability of use in two distinct standard methods of installation. By furnishing a push button switch suitable for mounting upon a molding or other support, and formed to fit within the transverse limits of the molding, the use of the less desirable snap switch may be avoided, the same being substituted for by a push button switch which, as above stated, is the most desirable type of switch for the service concerned at present in the art.

It is manifest that the form and nature of the connection means or plate E may be widely varied from the specific disclosure herein made. And therefore, I do not desire to be understood as limiting myself to the specific construction of said connection means or plate E, shown and described. Neither do I desire to be understood as limiting myself to the particular construction and method of application of the several connection devices herein shown and described for uniting the connection means or plate E with the switch and with the box or casing C as well as with the face plate F; nor as limiting myself to the particular form of push button switch, nor to the relative arrangement and association of parts and members concerned in carrying out the entire invention. But on the contrary, I reserve the right to vary the same, in adapting the improvements to varying conditions of use, without departing from the spirit of the invention or the terms of the following claims:—

Having thus described my invention, I claim and desire to secure by Letters Patent:—

1. The combination of a push-button switch adapted for use as a molding switch, of a removable connecting member whereby the switch may be installed within a wall box or casing.

2. The combination with a push-button switch normally adapted to be used upon a molding, a detachable member adapted to be removably secured to the switch that it may be used as a flush switch.

3. The combination with a push-button switch, a detachable connecting member employed only when such switch is installed in a box or casing that the switch may be used as a flush switch.

In testimony whereof, I have signed my name to this specification in the presence of two subscribing witnesses.

CHARLES JULIUS KLEIN.

Witnesses:
PERCY L. ELIAS,
MICHAEL R. MATTEO.